(12) United States Patent
Agerton et al.

(10) Patent No.: US 11,932,751 B2
(45) Date of Patent: *Mar. 19, 2024

(54) ARTICLE WITH VISUAL EFFECTS

(71) Applicant: The Procter & Gamble Company, Cincinnati, OH (US)

(72) Inventors: Mark Lewis Agerton, Mason, OH (US); Marc Andrew Mamak, Mason, OH (US); John Andrew McDaniel, Middletown, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 154 days.

This patent is subject to a terminal disclaimer.

(21) Appl. No.: 17/487,063

(22) Filed: Sep. 28, 2021

(65) Prior Publication Data
US 2022/0010098 A1 Jan. 13, 2022

Related U.S. Application Data

(63) Continuation of application No. 15/401,160, filed on Jan. 9, 2017, now Pat. No. 11,161,966.
(Continued)

(51) Int. Cl.
*C08K 5/5419* (2006.01)
*B29C 49/00* (2006.01)
(Continued)

(52) U.S. Cl.
CPC ........ *C08K 5/5419* (2013.01); *B29C 49/0005* (2013.01); *B29C 49/04* (2013.01);
(Continued)

(58) Field of Classification Search
CPC .............................. B29C 49/04; C08K 5/5419
See application file for complete search history.

(56) References Cited

U.S. PATENT DOCUMENTS

| | | | |
|---|---|---|---|
| 3,246,062 | A | 4/1966 | Scott, Jr. |
| 4,144,214 | A | 3/1979 | Corbacella |

(Continued)

FOREIGN PATENT DOCUMENTS

| | | | |
|---|---|---|---|
| CN | 1098422 A | 2/1995 | |
| CN | 1185458 A | 6/1998 | |

(Continued)

OTHER PUBLICATIONS

"Xiameter PMX-200 Silicone Fluid, 50-1,000 CS", Oct. 11, 2012, URL: https://www.xiameter.com, retrieved on Jun. 12, 2015.
(Continued)

*Primary Examiner* — Arrie L Reuther
(74) *Attorney, Agent, or Firm* — Jay A. Krebs; Alexandra S. Anoff

(57) ABSTRACT

A blow molded article, a method of making a blow molded article and a method of making a preform each having at least one layer comprising a thermoplastic resin and between 0.1% and 20% of an additive having a viscosity of greater than 1,000,000 cst. There is a refractive index difference of at least 0.04 between the additive and the thermoplastic resin. The high viscosity of the additive ensures even distribution of the additive within the thermoplastic resin in discrete domains, while additionally providing for a complex end look balancing opacity, gloss and depth.

18 Claims, 4 Drawing Sheets

Related U.S. Application Data

(60) Provisional application No. 62/279,837, filed on Jan. 18, 2016.

(51) Int. Cl.
    *B29C 49/04* (2006.01)
    *B29K 101/12* (2006.01)
    *B29K 105/00* (2006.01)
    *B29L 31/00* (2006.01)

(52) U.S. Cl.
    CPC .. *B29K 2101/12* (2013.01); *B29K 2105/0094* (2013.01); *B29L 2031/7158* (2013.01)

(56) References Cited

U.S. PATENT DOCUMENTS

| | | | |
|---|---|---|---|
| 4,746,689 A | 5/1988 | Sullivan | |
| 4,837,262 A | 6/1989 | Jeon | |
| 4,874,807 A | 10/1989 | Endo | |
| 4,879,331 A | 11/1989 | Endo et al. | |
| 4,943,458 A | 7/1990 | Buecheler | |
| 5,247,019 A | 9/1993 | Cozens | |
| 5,397,610 A | 3/1995 | Odajima | |
| 5,502,095 A | 3/1996 | Ueshima | |
| 5,708,084 A | 1/1998 | Hauenstein et al. | |
| 5,788,926 A | 8/1998 | Oda | |
| 6,013,715 A | 1/2000 | Gornowicz | |
| 6,013,723 A | 1/2000 | Akao | |
| 6,417,293 B1 | 7/2002 | Chorvath | |
| 6,465,552 B1 | 10/2002 | Chorvath | |
| 6,562,887 B1 | 5/2003 | Kurasawa | |
| 7,019,048 B2 | 3/2006 | Brehm | |
| 7,195,806 B2 | 3/2007 | Dekunder | |
| 7,470,732 B2 | 12/2008 | Hobbs | |
| 7,754,803 B2 | 7/2010 | Fujiwara | |
| 7,879,440 B2 | 2/2011 | Yatsuzuka | |
| 7,989,558 B2 | 8/2011 | Ofer | |
| 8,097,317 B2 | 1/2012 | Katou | |
| 8,535,710 B2 | 9/2013 | Day et al. | |
| 8,535,770 B2 | 9/2013 | Wang | |
| 8,859,067 B2 | 10/2014 | Wang | |
| 9,676,135 B2 | 6/2017 | Wang | |
| 2003/0175499 A1 | 9/2003 | Phillips | |
| 2004/0191492 A1 | 9/2004 | Reilly | |
| 2004/0236025 A1 | 11/2004 | Dekunder | |
| 2005/0129888 A1 | 6/2005 | Kwon | |
| 2006/0047029 A1 | 3/2006 | Poloso | |
| 2006/0189744 A1 | 8/2006 | Tse | |
| 2006/0199887 A1 | 9/2006 | Liang | |
| 2007/0007680 A1 | 1/2007 | Henri | |
| 2008/0045638 A1 | 2/2008 | Chapman | |
| 2008/0167597 A1 | 7/2008 | Dougherty | |
| 2009/0170984 A1 | 7/2009 | Blum | |
| 2009/0318593 A1 | 12/2009 | Stoll | |
| 2010/0040813 A1 | 2/2010 | Wada | |
| 2010/0152361 A1 | 6/2010 | Hermel-davidock et al. |
| 2013/0064999 A1 | 3/2013 | Wang et al. |
| 2014/0319013 A1 | 10/2014 | Wang |
| 2014/0319014 A1 | 10/2014 | Wang |
| 2017/0204251 A1 | 7/2017 | Agerton et al. |

FOREIGN PATENT DOCUMENTS

| | | |
|---|---|---|
| CN | 102002217 A | 4/2011 |
| CN | 102197083 A | 9/2011 |
| CN | 102227359 A | 10/2011 |
| CN | 102942742 A | 2/2013 |
| EP | 0456929 A2 | 11/1991 |
| GB | 1555842 A | 11/1979 |
| JP | 49016732 A | 2/1974 |
| JP | H0418446 A | 1/1992 |
| JP | H0538787 A | 2/1993 |
| JP | H0680789 A | 3/1994 |
| JP | H09155958 A | 6/1997 |
| JP | H1016095 A | 1/1998 |
| JP | 2000248165 A | 9/2000 |
| JP | 2000280420 A | 10/2000 |
| JP | 2001240618 A | 9/2001 |
| JP | 2004018629 A | 1/2004 |
| JP | 2005096844 A | 4/2005 |
| JP | 2006299033 A | 11/2006 |
| JP | 2006307072 A | 11/2006 |
| JP | 2008088401 A | 4/2008 |
| JP | 2012207208 A | 10/2012 |
| KR | 20070019084 A | 2/2007 |
| WO | 2006025903 A1 | 3/2006 |
| WO | 2012062215 A1 | 5/2012 |

OTHER PUBLICATIONS

AA1057 PCT Search Report and Written Opinion for PCT/US2017/013710 dated Apr. 13, 2017, 10 pages.
All Office Actions, U.S. Appl. No. 14/254,949, filed Apr. 17, 2014.
All Office Actions; U.S. Appl. No. 14/254,954, filed Apr. 17, 2014.
All Office Actions; U.S. Appl. No. 15/401,160, filed Jan. 9, 2017.
Androit et al., "Silicones in Industrial Applications", a chapter from the bookInorganic Polymers, published by Nova Science Publishers, 106 pgs.
AZoM "Low Density Polyethylene—LDPE" 3 pgs., May 11, 2001, URL http://www.azom.com/article.asp?ArticleID=428.
Database WPIWeek 199734Thomson Scientific, London, GB;AN 1997-368314.
Database WPIWeek 199813Thomson Scientific, london, GB;AN 1998-139659XP00273688.
Database WPIWeek 200172Thomson Scientific, London, GB;AN 2001-621670.
Kirschenbauer, "Fats and Oil: An Outline of their Chemistry and Technology", 1960, 3 Pages.
MatWeb (MatWeb, "Dow Corning 360 Medical Fluid," http://www.matweb.com/search/datasheet_print.aspx?matguid=7e4a323570dc40b4ae5353, p. 1, accessed Nov. 8, 2017).

ARTICLE WITH VISUAL EFFECTS

TECHNICAL FIELD

The present invention relates to a process for blow molding an article with visual effects, for example having a glossy and/or opaque exterior, wherein the article has at least one layer comprising a thermoplastic resin and a high viscosity additive.

BACKGROUND

Containers made of thermoplastic materials such as polyethylene terephthalate (PET) are popularly used in various industries, including the cosmetic, laundry, and food industries. For such containers, having a glossy or pearlescent appearance is particularly appealing to users and tends to connote a premium product.

There are various ways in which to achieve a pearlescent effect. For example, JP 2004-18629 by Fujitsu Limited discloses use of particles such as pearlescent mica, aluminium oxide, silicon dioxide and glass fibers mixed with thermoplastic materials to make a pearlescent container. The pearlescent effect of such a container is achieved by interference caused by the added particles as light passes through the article. However, there are many reasons why use of such particles is undesirable, including, for example: the negative effect such particles have on the surface texture and resulting gloss; the generation of weld lines formed when separate melt fronts of a melted thermoplastic material meet; and wear on extruder components. Furthermore, it is difficult to achieve a monolayer container with a pearlescent effect having both high opacity and high gloss, since the surface gloss is generally reduced as the loading of inorganic pigments is increased to achieve high opacity.

Silicone has been reported for use in formation of thermoplastic articles. U.S. Pat. No. 5,708,084 by Dow Corning, US 2008/0167597 by Playtex Products, Inc and JP 2004-018629 by Fujitsu all discuss use of silicone for improving mechanical strength, improving lubricity of a thermoplastic article and as a processing aid. U.S. Pat. Nos. 8,535,710 and 8,859,067, both filed by the Procter & Gamble Company, build on this, by using silicone as an additive in a thermoplastic material to provide a glossy exterior for a blow molded article. The additive used in U.S. Pat. Nos. 8,535,710 and 8,859,067 is a siloxane fluid having a viscosity of no greater than 1,000,000 cst. While this provides an article with a glossy and lustrous exterior, the resultant aesthetics are not consistent throughout the article. Furthermore, to maintain structural integrity of the article, there are limitations on the amount of siloxane fluid that may be used, and thus the visual benefit that may be perceived by a consumer.

High molecular weight (HMW) silicone has also been used in the formation of different articles to enhance manufacturing, for example, with better release of articles from an injection mold, decreased cycle time due to the ability to use lower processing temperatures, etc. Dow Corning build on this in a chapter entitled "Silicones in Industrial Applications" in the book *Inorganic Polymers*, an advanced research book by Nova Science Publishers. However, use of HMW silicone has thus far been limited as other changes occur in the thermoplastic material as the amount of HMW silicone included is increased.

Thus, there is still a need to find a better way to provide visual benefits to a container while maintaining structural integrity.

SUMMARY

According to a first aspect of the invention, there is provided a blow molded article, or layer of a blow molded article comprising a thermoplastic resin, between 0.1% and 20% of an additive having a viscosity of greater than 1,000,000 cst, wherein there is a refractive index difference of at least 0.04 between the additive and the thermoplastic material.

According to a second aspect of the present invention, there is provided a method of blow molding an article, comprising the steps of forming a blow mold blend comprising a thermoplastic resin and between 0.1% and 20% of an additive having a viscosity of greater than 1,000,000 cst, wherein there is a refractive index difference of at least 0.1 between the additive and the thermoplastic resin, and blow molding the blow mold blend to form an article.

The relatively high viscosity of the additive ensures that when it is added to the thermoplastic resin, the droplets of additive form discrete domains within the thermoplastic resin rather than coalescing with one another to form "puddles" of the additive. Thus, the additive is well dispersed throughout the thermoplastic resin (rather than collecting in particular areas) which helps maintain structural integrity of the article. Furthermore, since the domains remain relatively small, they allow for better scattering of light as it passes through the article. Finally, the refractive index difference between the additive and the thermoplastic resin provides for visual effects caused by diffraction/dispersion of light as it passes through the article.

While the present invention may be used in a single layer of a multi-layer article, use of this combination of thermoplastic resin and high viscosity additive makes it possible to achieve a complex end look balancing opacity, gloss and depth, in an article formed of a single layer.

Preferably, the article comprises from 0.5% to 10%, or more preferably 3% to 5% of additive.

The % of additive can be modified dependent on the visual effects desired in a particular article. Specifically, the amount of additive may be optimized to ensure some scattering of light, and therefore some visual effect such as the presence of an aura and/or glossiness, without rendering the article so opaque that these other visual effects are no longer perceptible.

In an embodiment, the additive has a viscosity of no greater than 50,000,000 cst. Although, in theory, additives of greater viscosity could be added to the above described article, there is a likelihood this would lead to manufacturing complexities. For example, using an additive of higher viscosity may require longer residence times.

In an embodiment, the method of forming the article further comprises first forming a masterbatch by mixing the additive together with a carrier material prior to forming the blow molding blend, wherein the carrier material is a thermoplastic material selected from the group consisting of low molecular weight waxes such as montan wax (available from Clariant under the tradenames Licowax, Licolube, Licomont), polar polyolefin waxes (available from Clariant under the trade name Licocene or Honeywell under the trade name A-C performance additives), amide waxes (available from Clariant under the trade name Licowax C), HYTREL and acrylate copolymers such as Elvaloy AC from Dupont and low melting point copolymer polyesters such as Renol, sold by Clariant. The masterbatch form can be that of a pellet, powder, flakes or a liquid.

Preparation of a masterbatch may aid the manufacturing process. Premixing the additive with a carrier material allows for better control of homogeneity of the additive within the carrier and minimizes complexities with introduction of the additive directly into the extruder.

In such an embodiment, the masterbatch preferably comprises a ratio of additive to carrier material of between 35:65 to 65:35, preferably 50:50.

It is generally beneficial to add as much additive to the masterbatch as possible to reduce the amount of masterbatch required for production of the final article. Use of an additive having relatively higher viscosity enables a much greater ratio of additive to carrier material, as the additive will maintain its general shape (rather than bleeding, exuding or running) when mixed with the carrier material.

In an embodiment, the final article, or a layer of the final article, comprises between 10 to 1000, preferably 50 to 150, discrete domains of the additive per 1000 $\mu m^3$ of the layer.

This is considered to be the optimal number of discrete domains to achieve the desired visual benefits. Without being bound by theory, it is thought that if there are insufficient domains of the additive present, then only a very small amount of light entering the article will be scattered and/or reflected. So the perception of any visual effect seen by a consumer passing by the product on shelf will be minimal. By contrast, if there are too many domains of the additive present, then light will continually scatter off the different domains causing internal reflection thus rendering the article opaque, and diminishing the visual benefits being sought in the present invention.

Preferably, at least 50% of the discrete domains in the preform and/or finished article have an aspect ratio of greater than 0, preferable between 0.01 and 0.8. Based on visual differences detected between the neck area and the body, it is apparent that the aspect ratio contributes significantly to the overall impression of depth, aura and glossiness of the finished article.

Preferably, the viscosity of the additive in the blow-molded article will be +/−10% of the viscosity of the additive at the time it is included during manufacture.

BRIEF DESCRIPTION OF THE DRAWINGS

While the specification concludes with claims, it is believed that the same will be better understood from the following description taken in conjunction with the accompanying drawings in which:

DETAILED DESCRIPTION

Figure 1A:
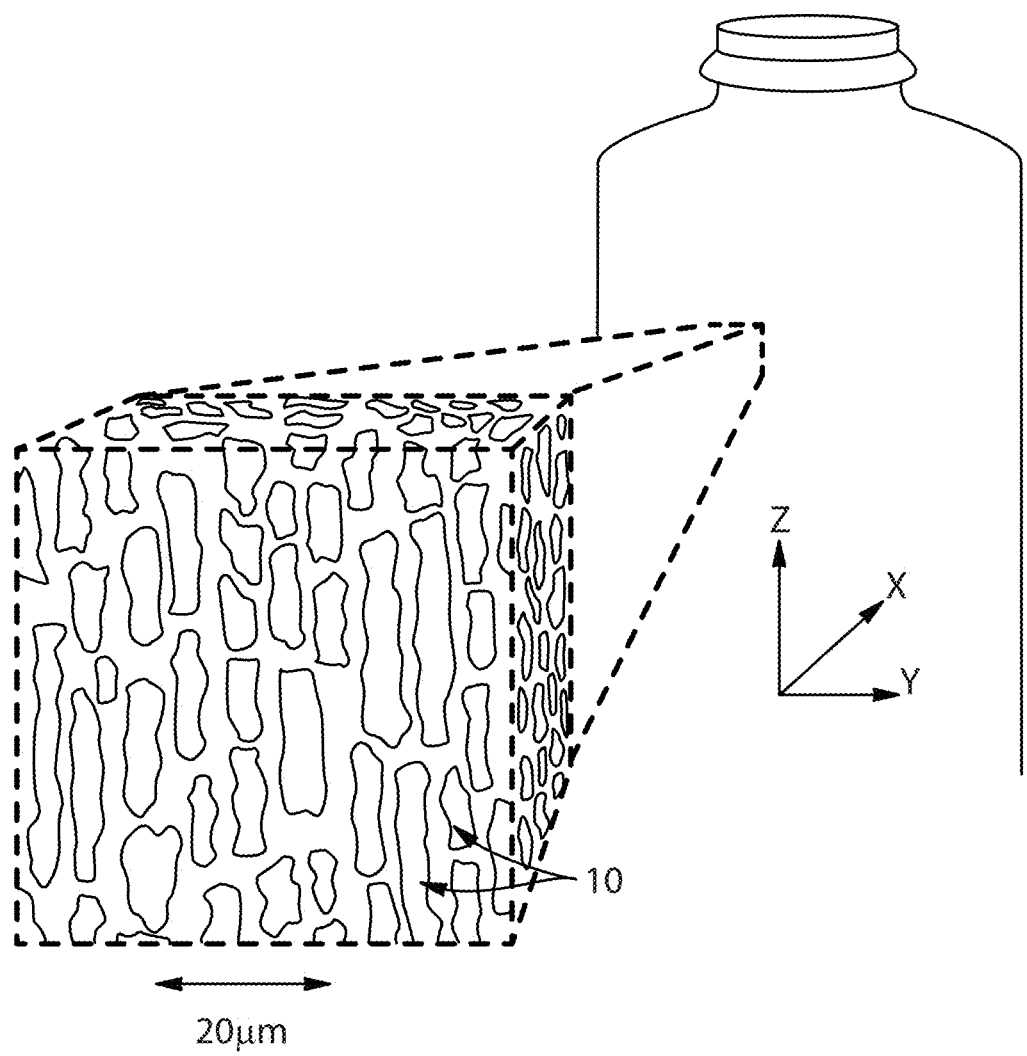
FIGS. 1A and 1B show schematically domains of additive as they are present in a final article of the present invention (FIG. 1A shows an area of neck and FIG. 1B shows an area of the body)

It has surprisingly been found by the inventors of the present invention that the aesthetics of a thermoplastic article can be significantly enhanced with inclusion in a thermoplastic resin of from 0.1% to 20% of an additive having a viscosity of greater than 1,000,000 cst and a refractive index difference of at least 0.04 relative to the thermoplastic resin. Use of an additive having a relatively high viscosity ensures that, upon inclusion in the thermoplastic resin, the additive forms into relatively small separate droplets that are evenly dispersed throughout the resin. Without being bound by theory, it is thought that the high viscosity of the additive ensures that while mixing the additive with the thermoplastic material, the droplets of additive retain their size and shape to form discrete domains, rather than coalescing with one another and/or spreading thinly throughout the thermoplastic resin. This means that the visual effect generated is enhanced and consistently dispersed throughout the article (or layer of the article).

The specific concentration and size of the droplets can be controlled and modified according to the desired visual effect. For example, where a relatively transparent bottle featuring significant glow and depth of light reflection is required, less additive or additive having a smaller droplet size may be included. By contrast, if it is intended for the article to be relatively opaque, more additive may be included while maintaining the small particle size. This facilitates the desired opacity while still providing a perception of depth and glow when the article is viewed by a consumer.

As the visual effect generated is exaggerated and better controlled in the present invention compared with previous known methods, it is possible to reduce the overall amount of additive and/or masterbatch included in the thermoplastic material. This reduces the cost of manufacturing the article and helps to improve the structural integrity. In this respect, it is known that an article such as that described in the present invention would be structurally most rigorous as the percentage content of thermoplastic resin is increased.

Definitions

All percentages are weight percentages based on the weight of the composition, unless otherwise specified. All ratios are weight ratios, unless specifically stated otherwise. All numeric ranges are inclusive of narrower ranges; delineated upper and lower range limits are interchangeable to create further ranges not explicitly delineated. The number of significant digits conveys neither limitation on the indicated amounts nor on the accuracy of the measurements. All measurements are understood to be made at about 25° C. and at ambient conditions, where "ambient conditions" means conditions under about one atmosphere pressure and at about 50% relative humidity.

"Article", as used herein refers to an individual blow molded object for consumer usage, e.g., a shaver, a toothbrush, a battery, or a container suitable for containing compositions. Preferably the article is a container, non-limiting examples of which include a bottle, a tottle, a jar, a cup, a cap, and the like. The term "container" is used to broadly include elements of a container, such as a closure or dispenser of a container. The compositions contained in such a container may be any of a variety of compositions including, but not limited to, detergents (e.g., laundry detergent, fabric softener, dish care, skin and hair care), beverages, powders, paper (e.g., tissues, wipes), beauty care compositions (e.g., cosmetics, lotions), medicinal, oral care (e.g., tooth paste, mouth wash), and the like. The container may be used to store, transport, or dispense compositions contained therein. Non-limiting volumes containable within the container are from 10 ml, 100 ml, 500 ml or 1000 ml to 1500 ml, 2000 ml or 4000 ml.

"Blow molding" refers to a manufacturing process by which hollow cavity-containing plastic articles are formed, preferably suitable for containing compositions. The blow molding process typically begins with melting or at least partially melting or heat-softening (plasticating) the thermoplastic and forming it into a parison or perform, where said parison or perform can be formed by a molding or shaping step such as by extrusion through a die head or injection molding. The parison or perform is a tube-like piece of plastic with a hole in one end through which compressed gas can pass. The parison or perform is clamped into a mold and air is pumped into it, sometimes coupled with mechanical stretching of the parison or perform (known as "stretch blow-molding"). The parison or perform may be preheated before air is pumped into it. The pressure pushes the thermoplastic out to conform to the shape of the mold containing it. Once the plastic has cooled and stiffened, the mold is opened and the part ejected. In general, there are three main types of blow molding: extrusion blow molding (EBM), injection blow molding (IBM), and injection stretch blow molding (ISBM).

"Domain" as used herein refers to an enclosed area formed within a larger area of thermoplastic material. The domain may be filled with another thermoplastic material that is partially miscible or immiscible with the larger thermoplastic material and/or an additive that is also immiscible or partially miscible with the larger thermoplastic material. Alternatively or additionally, the domain may further have fluid, air or some other gas trapped within. Domains are formed at the time of mixing different materials together. The distribution of domains will depend on a number of factors, including the relative viscosity of the different materials and the speed of mixing the different materials. When first making a preform, any domains formed are likely to be substantially spherical or tubular in shape. Once blow-molded, these substantially spherical or tubular domains take on a more elongate form. If the article is formed by stretch blow-molding, the resultant domains in the final article will likely have a ribbon-like form, forming elongate strands in the direction the article is most stretched.

"Refractive Index (RI)", as used herein, means a ratio of the speed of light in vacuum relative to that in another medium. RI (nD25) data is used herein, where nD25 refers to the RI tested at 25° C. and D refers to the D line of the sodium light. The calculation method of the RI (nD25) and the RI (nD25) data of certain example materials are described hereinafter.

"Pearlescent agent" as used herein refers to a chemical compound or a combination of chemical compounds of which the principle intended function is to deliver a pearlescent effect to a packaging container or a composition.

"Processing temperature" as used herein refers to the temperature of the mold cavity during the blow step of a blow molding process. During the blow step, the temperature of the material will eventually approach the temperature of the mold cavity, i.e., the processing temperature. The processing temperature is typically higher than the melting point of the material. Different thermoplastic materials typically require different processing temperatures, depending on factors including: melting point of the material, blow molding type, etc.

"Substantially free" of a specific ingredient means that the composition comprises less than a trace amount, alternatively less than 0.1%, alternatively less than 0.01%, alternatively less than 0.001%, by weight of the composition of the specific ingredient.

"Liquid" includes gel matrices, liquid crystals, etc. Liquids may be Newtonian or non-Newtonian, and may exhibit a yield point, but flow under sufficient shear stress under standard temperature and pressure conditions.

As used herein, the articles including "a" and "an" when used in a claim, are understood to mean one or more of what is claimed or described.

As used herein, the terms "comprise", "comprises", "comprising", "include", "includes", "including", "contain", "contains", and "containing" are meant to be non-limiting, i.e., other steps and other ingredients which do not affect the end of result can be added. The above terms encompass the terms "consisting of" and "consisting essentially of".

Thermoplastic Materials

An article of the present invention, or where the article is formed of layers, a layer of the article, comprises more than 50% of a thermoplastic resin, selected from the group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylate terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), or a polyolefin, for example one of low-density polyethylene (LDPE), linear low-density polyethylene (LLPDE), high-density polyethylene (HDPE), propylene (PP) and a combination thereof. Preferably, the thermoplastic resin is selected from the group consisting of PET, PETG, PEN, PS, and a combination thereof. More preferably, the thermoplastic resin is PET.

Recycled thermoplastic materials may also be used, e.g., post-consumer recycled polyethylene terephthalate (PCR-PET); post-industrial recycled polyethylene terephthalate (PIRPET); regrind polyethylene terephthalate.

The thermoplastic materials described herein may be formed by using a combination of monomers derived from renewable resources and monomers derived from non-renewable (e.g., petroleum) resources. For example, the thermoplastic resin may comprise polymers made from bio-derived monomers in whole, or comprise polymers partly made from bio-derived monomers and partly made from petroleum-derived monomers.

The thermoplastic resin used herein could have relatively narrow weight distribution, e.g., metallocene PE polymerized by using metallocene catalysts. These materials can improve glossiness, and thus in the metallocene thermoplastic execution, the formed article has further improved glossiness. Metallocene thermoplastic materials can, however, be more expensive than commodity materials. Therefore, in an alternative embodiment, the article is substantially free of the expensive metallocene thermoplastic materials.

Additive

The article comprises from about 0.1%, 0.3%, 0.5% or 1% to about 5%, 10%, 15% or 20% by weight of the article or a layer of the article, of an additive. In a preferred embodiment, the article comprises from about 4% to 6% by weight of the article or a layer of the article of an additive. The amount of additive present in the article is relatively low to ensure structural integrity and to allow ease and efficiency of recycling.

A wide variety of additives are suitable for use herein. In embodiments, the additive has a viscosity of greater than 1,000,000 cst. Preferably, the additive has a viscosity of between 1,000,000 cst, 2,500,000 cst, 5,000,000 cst to 10,000,000 cst, 15,000,000 cst or 50,000 000 cst. The high viscosity ensures that as the additive is mixed with the thermoplastic resin, the small droplets of the additive remain separate and do not coalesce, thereby forming discrete domains. Furthermore, the high viscosity ensures a degree of immiscibility between the additive and the thermoplastic material. The additive further has a refractive index difference of from about 0.04, 0.1, 0.5, 1.0, 1.3 or 1.7 to 2.0, 2.5 or 3.0 relative to the thermoplastic material. The difference in refractive index ensures that light passing through the article is refracted or scattered when passing between the thermoplastic material and the additive, thus providing a different perception of the exterior of the article to a person viewing the article. Preferably the refractive index of the thermoplastic resin is higher than that of the additive.

In addition to the parameters defined above, some additives may be preferred due to other characteristics, including but not limited to: state under ambient temperature (namely, liquid or solid or gas), odour characteristic, commercial availability, cost, etc.

Preferably, the additive is selected from the group consisting of an alcohol, oil, siloxane fluid, water, and a combination thereof.

In one embodiment, the additive is an alcohol preferably selected from the group consisting of a diol, triol, and a combination thereof. More preferably, the alcohol is selected from the group consisting of ethylene glycol, propylene glycol, glycerol, butanediol, butanetriol, poly(propylene glycol), derivatives thereof, and a combination thereof. Most preferably, the additive is glycerol.

In another embodiment, the additive is an oil selected from the group consisting of a plant oil, an animal oil, a petroleum-derived oil, and a combination thereof. For example, the additive could be an animal oil selected from the group consisting of tallow, lard, and a combination thereof. Preferably the additive is a plant oil selected from sesame oil, soybean oil, peanut oil, olive oil, castor oil, cotton seed oil, palm oil, canola oil, safflower oil, sunflower oil, corn oil, tall oil, rice bran oil, derivative and combinations thereof.

In a further embodiment, the additive is a siloxane fluid and may be a linear or branched polymer or copolymer. For example, the siloxane fluid may be a diorganosiloxane having one or more pendant or terminal groups selected from a group consisting of hydroxyl, vinyl, amine, phenyl, ethyl and mixtures thereof. Other suitable siloxane fluids include polydimethylsiloxane homopolymers, copoloymers consisting essentially of dimethylsiloxane units and methylphenylsiloxane units, copolymers consisting essentially of diphenylsiloxane units and methylphenylsiloxane units. Mixtures of two or more of such siloxane fluid polymers and copolymers may be used.

In an embodiment, the additive is siloxane fluid, preferably polydimethylsiloxane.

The additive may be in solid or liquid form under ambient temperature. A liquid additive enables a more homogeneous blend with the thermoplastic material before the blow molding, and significantly improves the surface smoothness of the container when located on the container's outer surface, versus pearlescent agents that are typically solid.

The additive herein may be either odorous or odorless. In one embodiment, the additive has an odor that matches the perfume of the composition contained in the container, thus attracting users when displayed on shelf or enhancing the perfume performance of the composition when being used. Alternatively, the additive is odorless and therefore does not adversely affect the perfume performance of the composition contained in the article.

The additive preferably has a relatively high flash point, for example a flash point of greater than 100° C., 150° C., 300° C. to about 400° C. or 500° C. Additives having relatively high flash points, particularly higher than the process temperature conditions (e.g., the typical EBM process temperature of 180° C.) are desirable as they allow for a safer manufacturing process.

Masterbatch

In an embodiment, the additive is first added to a carrier thermoplastic material to form a masterbatch that is subsequently added to the thermoplastic resin. The carrier thermoplastic material may be the same as the thermoplastic resin, or it may be different. In a preferred embodiment, the carrier thermoplastic material may be selected from the group consisting of low molecular weight waxes such as montan wax (available from Clariant under the tradenames Licowax, Licolube, Licomont), polar polyolefin waxes (available from Clariant under the trade name Licocene or Honeywell under the trade name A-C performance additives), amide waxes (available from Clariant under the trade name Licowax C) HYTREL and acrylate copolymers such as Elvaloy AC from Dupont and low melting point copolymer polyesters such as Renol, sold by Clariant. The masterbatch form can be that of a pellet, powder, flakes or a liquid.

Premixing the additive with a carrier material such as that mentioned above allows for better control of homogeneity of the additive within the carrier and minimizes complexities associated with introduction of the additive directly into the extruder. However, there is a need to balance the amount of carrier material to additive. In this respect, as the ratio of additive to carrier material increases, less masterbatch material is required for the final article—this helps to reduce the cost and increases efficiency during production. In the present invention, it is possible to have a balanced ratio of additive to carrier material as the high viscosity of the additive ensures that it retains its form when added to the carrier material.

In an embodiment, the ratio of additive to carrier thermoplastic material may be about 35:65, 40:60, 45:55, 50:50; 55:45, 60:40 or 65:35.

Adjunct Ingredient

The article of the present invention may comprise an adjunct ingredient present in an amount of from 0.0001%, 0.001% or 0.01% to about 1%, 5% or 9%, by weight of the article. Non-limiting examples of the adjunct ingredient include titanium dioxide, pearlescent agent, filler, cure agent, anti-statics, lubricant, UV stabilizer, anti-oxidant, anti-block agent, catalyst stabilizer, colourants, nucleating agent, and a combination thereof.

The pearlescent agent herein could be any suitable pearlescent agents, preferably selected from the group consisting of mica, $SiO_2$, $Al_2O_3$, glass fiber and a combination thereof. In one embodiment, low amounts of pearlescent agents are used to provide an enhanced glossy effect. For example, the article may comprise less than 0.5%, 0.1%, 0.01% or 0.001% of pearlescent agent by weight of the article. Without the incorporation of pearlescent agents or by minimizing the amount of pearlescent agent, the glossy container of the present invention avoids the negative impact of pearlescent agents on the surface smoothness of a container, and the recycling issue that use of pearlescent agents may cause.

The container may additionally or alternatively comprise a nucleating agent. Specific examples of the nucleating agent include: benzoic acid and derivatives (e.g., sodium benzoate and lithium benzoate), Sorbitol and derivatives, talc and zinc glycerolate, organocarboxylic acid salts, sodium phosphate and metal salts (e.g., aluminium dibenzoate). The addition of the nucleating agent could improve the tensile and impact properties of the container, as well as prevent the migration of the additive in the container. In the present invention, since the amount of additive is relatively low, the article may be substantially free of a nucleating agent, for example having less than 0.1%, 0.01% or 0.001%, by weight of the article, of the nucleating agent.

Manufacturing Process

The process for mixing together a thermoplastic material with one or more other thermoplastic materials or additives is well known in the art. In one embodiment, the additive is first combined with a carrier thermoplastic material to form a masterbatch. The masterbatch may be formed by: mixing the carrier thermoplastic material and additive under ambient temperature, and then extruding the resultant mixture in a twin screw extruder at a temperature of 260° C. to form pellets. The pellets are then cooled in a water bath at about 20° C. for 0.5 minutes to form a masterbatch. The twin screw extruder typically has an extruder length/diameter (L/D) of 43 and diameter of 35.6 mm, though it will be appreciated that may other forms of twin screw extruder, or other mixing equipment is known. If any adjunct ingredients are required, they may be added at this stage. For example, some pigment may be added to the masterbatch if the article is intended to be colored. The masterbatch is then physically mixed with the thermoplastic material (primary) to form a blow mold blend.

In an alternative embodiment, the additive is added directly to pellets of the thermoplastic material, without first forming a masterbatch. Any additional adjunct ingredients are also added at this stage, before extruding the resultant mixture in a twin screw extruder.

In preferred embodiments, the twin extruder operates at a speed of from 25 RPM, 100 RPM or 150 RPM to 200 RPM, 300 RPM or 400 RPM and temperature of between about 200° C., 250° C. or 260° C. to about 300° C., 350° C. or 400° C. It will be appreciated that the temperature of the extruder environment will be determined by the melting point of the thermoplastic material. In another embodiment, where molten thermoplastic material is used, the screw may remain at room temperature. Extruder rotational speeds and sheer induced by the screw can control the size and dispersion of droplets throughout the thermoplastic material.

Blowing of the blow mold blend can be conducted by any known blow molding process like extrusion blow molding (EBM), injection blow molding (IBM), or injection stretch blow molding (ISBM). In an ISBM or IBM process, the above blow mold blend is melted and injected into a preform before being subjected to a blow molding or stretch blow molding process. In an EBM process, the blow molded blend is melted and extruded into a parison before being subjected to a blow molding process. In each case, one of the preform or parison is blown in a mold to form the final article.

Article

In an embodiment, the present article is a layered container, comprising two or more material layers. For example, the container may have a barrier material layer or a recycled material layer between an outer thermoplastic layer and an inner thermoplastic layer. Such layered containers can be made from multiple layer parisons or preforms according to common technologies used in the thermoplastic manufacturing field. Within the layered containers, not all of the material layers necessarily comprise the combination of thermoplastic materials and additive of the present invention, but at least one should. As the intention of the invention is to provide a superior looking article on shelf, the outermost layer that is visible to a person viewing the shelf preferably comprises the features of the invention described therein. Alternatively, where the outermost layer is fully transparent, it is conceivable that the next layer in comprises the features of the invention. Generally, however, the outermost facing material layer comprises the additive. The article of the present invention has an external surface with improved and more consistent visual effects compared with other blow molded articles.

In an alternative embodiment, the article is a container formed of a single layer of thermoplastic resin combined with additive, having a thickness of between 0.2 mm, 0.3 mm, 0.7 mm to about 0.8 mm 1.0 mm, 1.1 mm or 1.3 mm. To date, it has been difficult to achieve complex visual effects in a single layer article, however, inclusion of a high viscosity additive in thermoplastic resin provides for opacity, while simultaneously providing other benefits of gloss, shine, depth and aura.

Figure 1B:
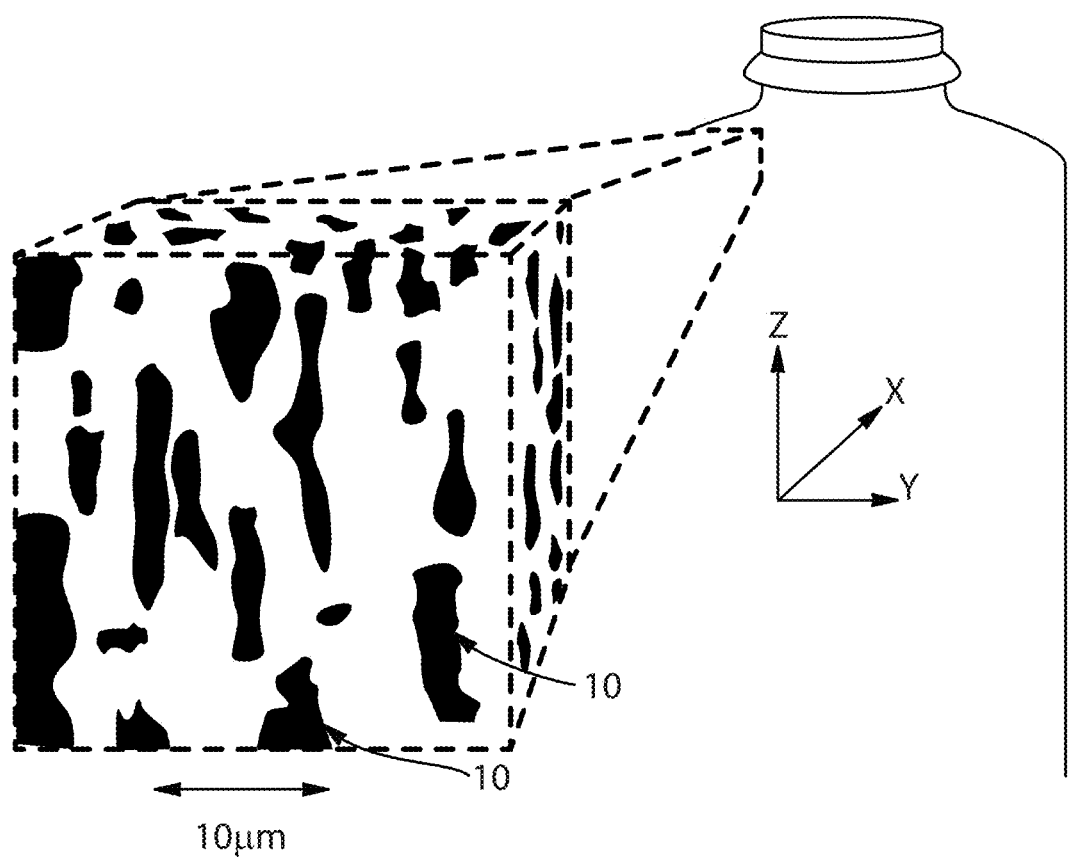
Figure 2A:
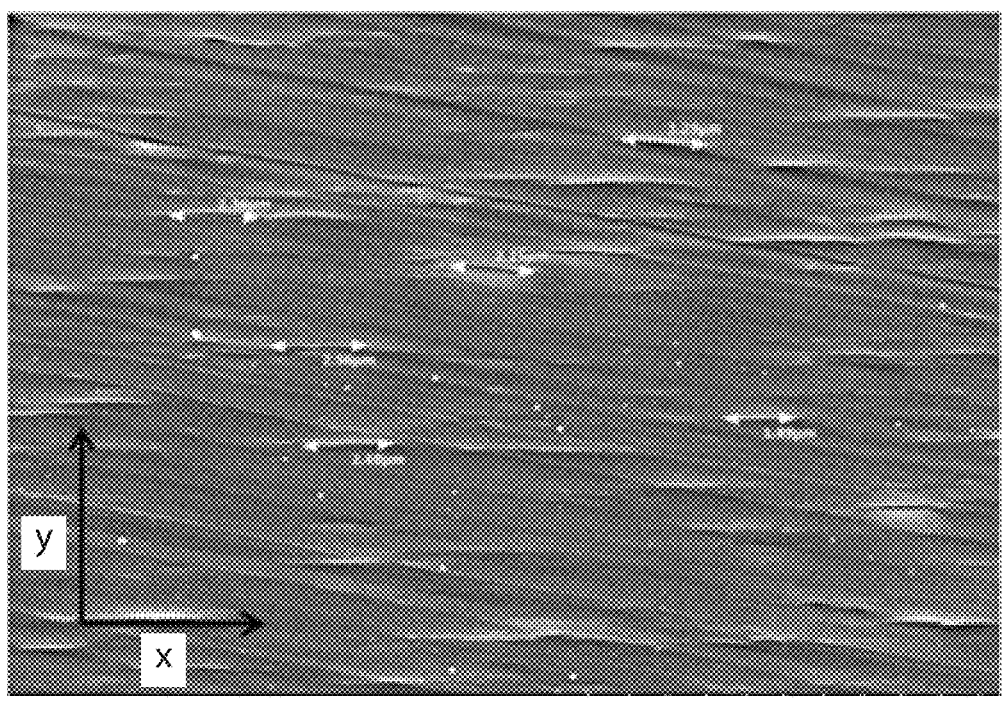
FIGS. 2A and 2B show SEM imaging of a bottle wall formed according to the present invention.
Figure 2B:
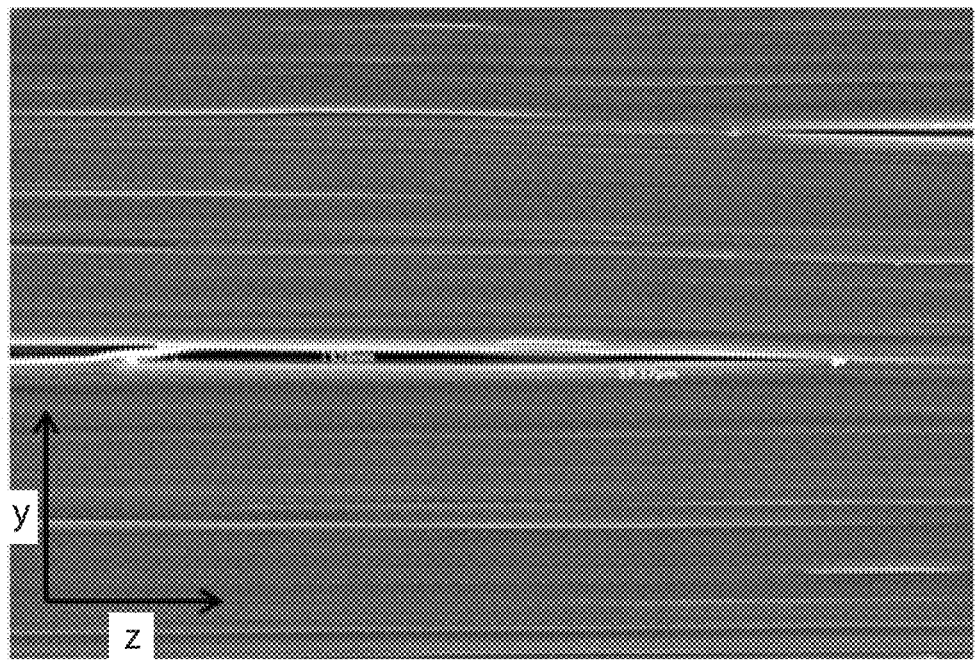
Figure 2C:
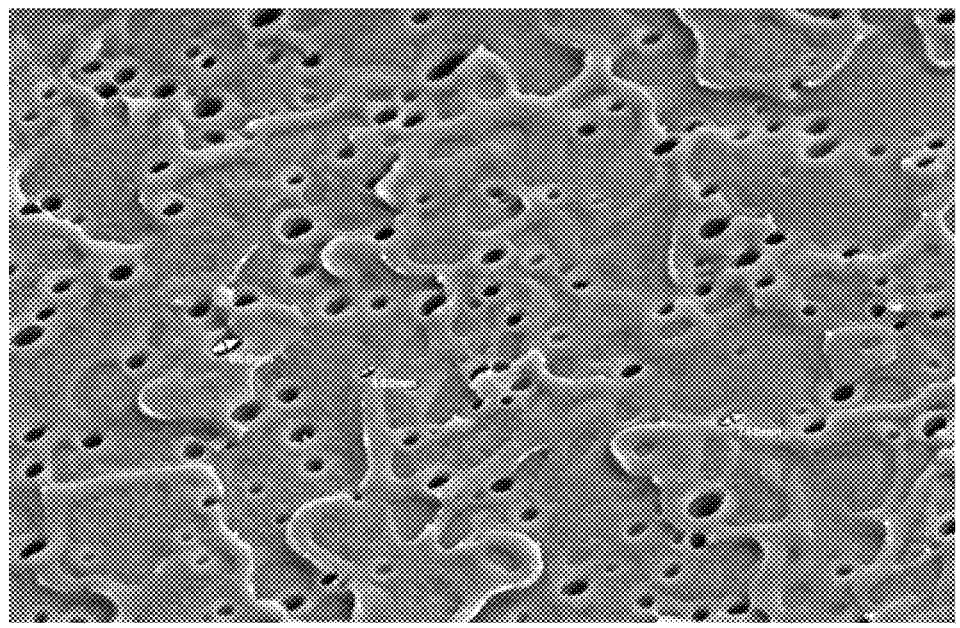
FIGS. 2C and 2D show SEM imaging of a bottle neck formed according to the present invention.
Figure 2D:
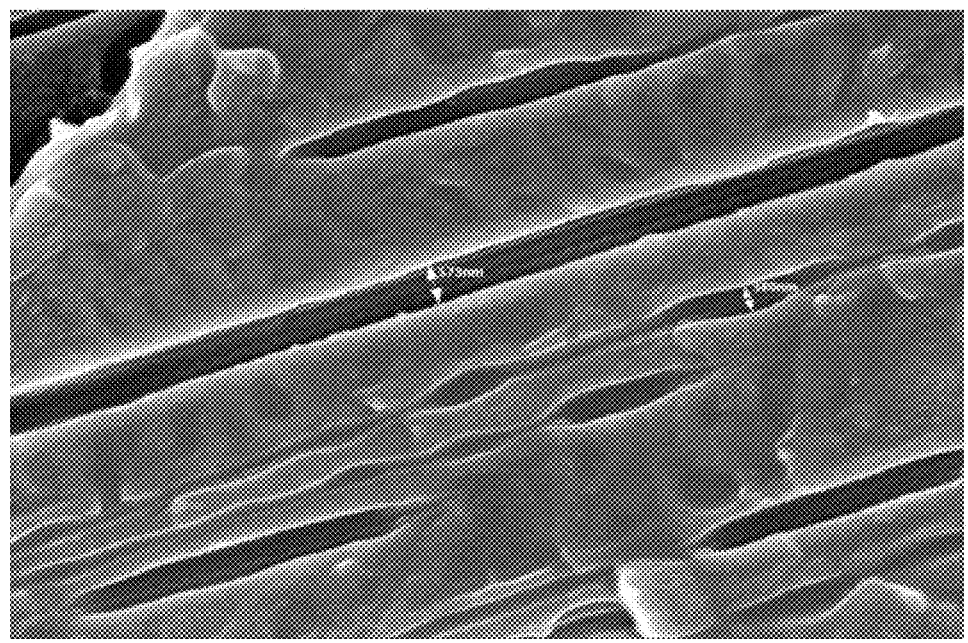

The final blow molded article or a layer of the final blow molded article comprises a thermoplastic material with discrete domains of additive dispersed therein. FIG. 1 shows a schematic of domains as they are seen in the neck (FIG. 1A) and body (FIG. 1B) of a bottle of the present invention. In both examples, a series of discrete domains can be seen. However, in the neck, it can be seen that the domains are generally more spherical/tubular in nature, whereas in the body, the domains are formed into elongate ribbons. This is because the area in the body of the bottle is stretched more than the neck region. Thus, the domains are likewise stretched out more in the body.

The volume of additive and the number and size of domains of the additive in the thermoplastic material can be modified dependent on the visual effect required in the final article. If too many domains are present, there will be internal reflection of light entering the article as it bounces from one domain to another, rendering the article opaque. Alternatively, if the article is not rendered entirely opaque, having too many domains may diminish the intensity of the visual effects as only some light will be able to leave the article. Conversely, if too few domains are provided in the article, then the visual effect may only be present in small isolated areas of the article and/or there may be insufficient domains for the light to reflect off. In an embodiment, there may be from 10, 50, 100 or 250 to 500, 600, 800 or 1000 domains per 1000 $\mu m^3$ of the article.

In an embodiment, the domains have an aspect ratio of greater than 0, preferably between 0.02 to 0.8 in the preform or neck area of an article (that is, an area that is not stretched), or between 0.4 to 0.9 in the body of an article (that is, an area that has been stretched during blow molding). FIGS. 1A and 1B show the orientation of different axes in articles of the present invention. X=axis parallel to circumference of article wall (representing width of the domains); Y=axis orthogonal to length of article wall (representing thickness of the domains); and Z=axis parallel to length of article wall (representing length of the domains).

For average aspect ratio ([L−T]/[L+T]), a minimum of 0 is a feature having equivalent major and minor dimensions (i.e., having equivalent length and thickness). A maximum of 1 is a feature with an infinitely large major dimension relative to its minor dimension (i.e., forming infinitely long and thin ribbons). Flatness of the domains may also be measured ([W−T]/[W+T]), where a flatness of 0 is equal to a perfectly circular cross-section, a maximum flatness of 1 is a feature with an infinitely thin cross-section.

I. Methods

Sample Preparation:

Sample material was sectioned using a razor to excise an approximate 2 cm×2 cm specimen from an article of the present invention. The exposed cross-section edges of the bottle were polished by hand with a 0.5 μm aqueous alumina suspension on a non-woven polishing media. The prepared cross-section specimen was mounted on a standard aluminium standard electron microscope (SEM) sample stub (12.7 mm round) using a carbon adhesive tab. The mounted sample was magnetron sputter coated with Au to a thickness of approximately 100-200 nm to reduce the negative effects of sample charging.

Scanning Electron Microscopy:

A region from a bottle neck (not stretched) is removed from an article with a hack saw or similar device. The neck piece is immersed in a liquid nitrogen bath for at least 10 minutes and then quickly removed using forceps or tweezers, wrapped in a towel and smashed with a hammer From the smashed pieces, pieces are selected that provide a cross-sectional viewing plane along the X-Y and Y-Z axes of the bottle. The specimen is affixed to an SEM sample substrate via known SEM techniques (cross-sectional holder with set screws, affixed using conductive tape or adhesives) with the newly exposed cross-section mounted for imaging with the electron beam. The mounted specimen is coated with a very thin conductive coating suitable for high resolution viewing (plasma sputtering with Au/Pd is preferred) in order to mitigate charging issues in SEM. A SEM which operates using high vacuum, such as a cold field emission Hitachi S-4700, rather than variable pressure or environmental modes is preferred, as is an SEM equipped with field emission gun (FEG SEM) to allow for viewing at higher resolution.

For a sample from the body of the article, a specimen at least 1.5 mm along its longest axis is removed. The specimen comprises both the exterior and interior wall surfaces as well as the internal region between them. A cross-sectional surface of the container wall in both the X-Y and Y-Z dimensions of the bottle is generated using a sharp razor blade, preferably a stainless steel single edge, PTFE-coated stainless steel GEM® blade. The SEM imaging is the same as that described above for the sample from the neck region.

Focused Ion Beam Sectioning:

A sample was ion milled in an FEI™ Helios 600 DualBeam™ FIB, operating at an accelerating voltage of 30 kV and variable currents between 1-21 nA. Sample material was milled at low incident angles of between 0.5°.

Focused Ion Beam-Scanning Electron Microscopy (FIB-SEM) Imaging:

The specimen was imaged at various electron voltages between 1 and 30 kV utilizing the Everhart Thornley Detector (ETD) operating in secondary electron mode. Domain structures produced the highest contrast at accelerating voltages of 2 and 5 kV.

Serial Sectioning:

FIB-SEM serial sectioning was performed on a FEI™ Helios 600 DualBeam™ FIB with "Slice and View G2" automation package. First, a nominally flat surface of the specimen is cut in a region of interest. The experiment is then formed by imaging the cross-section of the flat region of interest with the electron beam, followed by removing a specified amount of material (10-100 nm) with the ion beam. After the removal of a slice of material, the region of interest is re-imaged in the electron beam in a serial fashion. The Slice and View G2 automation package allows the user to identify the dimensions of the region of interest that is to be sectioned and imaged. The set of electron beam images are recorded electronically for post processing, reconstruction and visualization.

Post Processing, Reconstruction and Visualisation.

Tilt correction, alignment and segmentation of the datasets were performed in MIPAR™ Version 1.0.0-beta.3 (http://www.mipar.us/). Tilt correction was first performed to account for the inherent shortening of electron images due to the sample's inclination to the electron beam. Slice-to-slice alignment was then accomplished through cross-correlation of the slices' fast Fourier transforms (FFTs). A segmentation "recipe" was then constructed by stringing together multiple image processing algorithms that result in a binary representation of each slice (i.e., black regions indicated domains). Datasets with unimodal domain size distributions required segmentation recipes that relied primarily on a single thresholding step. Datasets with multimodal size distributions required several threshold steps that targeted the different populations separately. The aligned and segmented slices were then stacked to create a 3D reconstructed volume. Metrics of interest were then calculated from the segmented volumes. The aligned and segmented volumes were then exported into an Avizo® file format. Animated movies which visualized the reconstruction process were generated in Avizo®, a commercial 3D data processing and visualization software package.

Energy Dispersive Spectroscopy (EDS) Mapping:

EDS mapping for silicone was performed on the final FIB slice of each respective data set using an FEI™ Sirion FEG-SEM equipped with an EDAX Octane silicon drift detector. An accelerating voltage 5 kV of 5 kV was used to limit charging of the uncoated sample.

Method for Extraction of High Molecular Weight Silicone from a Container

In order to characterize the silicone in the microvoids of a container, it may be necessary to isolate sufficient silicone to perform the necessary characterization measurements (e.g. viscosity). Any process which is capable of isolating sufficient silicone may be used. The isolated silicone material should be representative of the material in the microvoids—i.e. the isolation process should not alter the properties of the silicone or selectively extract a fraction with properties different from those of the silicone material present in the microvoids of the original container.

Silicone extraction processes may include several steps e.g. removal of labels, washing, grinding, cryo-grinding, milling (e.g. jet-milling), solvent extraction, soxhlet extraction; and the like. One skilled in the art will recognize that different isolation processes may be best suited to different containers. The process may depend on several factors, including the solubility of the polymer(s) of which the container is comprised and the presence of potential contaminants such as pigments, dyes, mold release agents, and the like. In some cases, it may be necessary to employ chemical methods to degrade or modify certain components of the container in order to facilitate separation of the silicone in an uncontaminated form. For example, polyesters such as PET may be degraded (or de-polymerized) via glycolysis which is well known in the art.

Method for the measurement of viscosity.

The viscosity of a sample of high viscosity polydimethylsiloxane was measured according to the Viscosity Measurement method described herein below before and after being subjected to the extraction procedure. The silicone viscosity was found to be largely unchanged (+/−10%) by the extraction procedure.

Viscosity Measurement

A TA Instruments DHR2 or equivalent rheometer is used with the following conditions:

23±1° C.

25 mm parallel plates

Frequency measurement 0.5 Hz at 1% strain sample gap 0.7±0.2 mm

The instrument is calibrated according to the manufacturer's specifications. About 0.6 g of isolated silicone is placed on the center of the lower plate and the upper plate is slowly lowered to about 0.75 mm (the trim gap). Excess silicone is removed from the perimeter of the plates and the gap is slowly reduced to about 0.70 mm (the sample gap). The frequency measurement is initiated and the kinematic viscosity in centiStokes (cSt) is reported as the viscosity of the material.

EXAMPLES

Domains in the Final Article:

Samples 1 and 2 were formed using a masterbatch consisting of 50% by weight of siloxane fluid (having a viscosity of 2,500,000 cst) and 50% by weight of carrier resin (PET—Intrinsic Viscosity (IV)=0.84) (MB50-012 from Dow Corning®) mixed with virgin PET (Dak Laser E60-A 0.84 IV) at a let-down ratio of 4% masterbatch to 96% PET resin (thus, overall approximately 2% of siloxane) to form a blow mold blend. The blow mold blend was dried prior to mixing with the masterbatch using a dehumidifying drier at 80° C. for ~4 to 6 hours using a conical hopper desiccant canister type such as that available from Plastic Process Equipment, Inc. (PPE). The dryer was operated under vacuum conditions until the blow mold blend was dried to less than 0.01% moisture content.

The dried blow mold blend was fed into an injection molding press using a conventional plasticizing screw extruder to form a homogenous stream of hot polymer melt. A Fanuc Roboshot S-2000i275B single cavity mold was used to make injection molded performs from the molten discharge at a barrel temperature of 290° C., screw speed of 55 rpm, molding pressure of 3500 psi, preform barrel pressure of 750 psi, cycle time of ~29 seconds, and a mold size of 28 grams.

The preform is allowed to cool before placing in a Sidel SBO 2/10 Universal blow molding machine where the cooled preform is heated above a polymer softening temperature using an infrared machine to 100-110° C. for about 2 minutes. The softened preform is then put into a container mold, a mechanical stretch rod is inserted into the preform to guide and stretch the preform in the axial direction. Pressurized air is introduced in 2 steps, as a pre-blow of 10-12 bar for 0.12 secs, followed by a second-blow of 35-38 bar to complete the blow molding of the bottle or container at a blow mold temperature of 17° C. The stretch ratio of the final article is about 2:1 to 12:1

Two sections were taken of a bottle body produced by the method described above. The first section is from the bottle panel wall from a region at about one half of the bottle height and having the measurements: z=74.0 µm, x=6.6 µm and y=37.9 µm.

The samples were excised and mounted for FIB-SEM serial sectioning and subsequently imaged, post-processed and reconstructed. Measurements based on these FIB-SEM images/samples are given below. As the reconstructed volumes themselves are animated and in 3D, they are not reproduced here. Instead, cross-sectional SEM images prepared by mechanical means described above in the method of Scanning Electron Microscopy from a bottle produced according to the same method are shown in FIG. 2 (2A and 2B show domains in a sample from the body of an article; 2C and 2D show domains in a sample from the neck of an article).

The following measurements were taken:
 Number of domains per square 1000 ($\mu m^3$): 86
 Average length of domains: 2.1 µm
 Average width: 1.05 µm
 Average thickness: 154 nm
 Average aspect ratio: 0.82
 Length (z-axis):300 nm-50 µm
 Thickness (y-axis): 150 nm to 450 nm
 Width (x-axis): 150 nm to 6.5 µm
 Average aspect ratio ([L/T]/[L+T]): 0.82
 Average flatness [W−T]/[W+T]: 0.67

Thus it can be seen that domains in the body of the sample bottle are considerably longer than they are thick or wide.

Example 2) A second section of the bottle from the neck region, with the following dimensions: X=7.5 µm, y=80.1 µm and z=55.6 µm was analysed using the same method, with the following results:

Number of domains per square 1000 ($\mu m^3$): 83
 Average length of domains: 1.8 µm
 Average width: 767 nm
 Average thickness: 485 nm
 Average aspect ratio: 0.48
 Length: 347 nm to 50 µm
 Thickness: 109 nm to 1050 nm
 Width: 240 nm to 3.8 µm
 Average aspect ratio ([L/T]/[L+T]): 0.48
 Average flatness [W−T]/[W+T]: 0.67

It can be seen that the aspect ratio of domains in the neck is considerably lower than that of domains in the body. This corresponds to the difference in visual effects perceived by consumers when viewing the body of a bottle compared with the neck. The body has greater gloss, depth and aura.

Viscosity of Additive in the Final Article:

Containers made using the method described above are emptied and labels are removed. The containers are washed with a warm aqueous surfactant solution (0.1% Dawn hand dish detergent, 60° C.), then rinsed with distilled water and dried. The containers are then cut or ground into pieces or particles about 1 cm×1 cm or smaller. 100 grams of the pieces are placed in a Buchner funnel and rinsed with hexane then dried. The dried particles are then added to a 1 L round bottomed flask containing 500 g ethylene glycol, 2 g hydrophobic fumed silica (Aerosil R972® or equivalent), and 1 g Zinc Acetate. The mixture is refluxed for 3 hours (approximately 197° C.). This procedure "de-polymerizes" the PET to form bis(2-hydroxyethyl) terephthalate. The silicone adheres to the surface of the hydrophobic fumed silica particles.

The temperature is reduced to 140° C. and the hot solution is suction filtered using a pre-heated Buchner funnel (140° C.) with Whatman GF/A glass microfiber filter paper. The 1 L round bottomed flask is rinsed with 200 g hot ethylene glycol (140° C.) which is then quickly added to the Buchner funnel. The filter paper/cake is suction filtered for about 30 minutes then dried under vacuum at about 120° C. for a minimum of 4 hours to remove residual ethylene glycol. The filter paper/cake is transferred to a cellulose extraction thimble (Whatman Cat No 2810432 or equivalent). The extraction thimble is placed in a soxhlet extraction apparatus containing 500 g methanol and extracted under reflux for 2 hours to remove any residual bis(2-hydroxyethyl) terephthalate or other compounds soluble in methanol. After being allowed to cool, the extraction thimble is removed from the apparatus and thoroughly drained. The extraction thimble is then placed in a clean soxhlet extraction apparatus containing 500 g chloroform and extracted under reflux for 3 hours in order to dissolve the silicone adhering to the fumed silica particles. After cooling, the chloroform is evaporated (e.g. using a rotary evaporator under vacuum) to recover the silicone material.

The isolated silicone material is analyzed using single bounce Attenuated Total Reflectance-Fourier Transform InfraRed Spectroscopy to ensure complete removal of PET oligomers and bis(2hydroxyethyl) terephthalate, as indicated by the absence of significant carbonyl absorbance at 1600 to 1800 $cm^{-1}$. If significant carbonyl absorbance is detected, the silicone is triturated with 50 mL warm methanol (45° C.) to remove contamination, then dried under vacuum at about 50° C. for 1 hour. The above process is repeated in order to obtain sufficient isolated silicone material for viscosity measurements.

The viscosity of the extracted polydimethylsiloxane was measured using a TA Instruments DHR2 rheometer using the following conditions:

23±1° C.
25 mm parallel plates
Frequency measurement, 0.5 Hz at 1% strain
sample gap 0.7±0.2 mm The instrument is calibrated according to the manufacturer's specifications. About 0.6 g of isolated silicone is placed on the center of the lower plate and the upper plate is slowly lowered to about 0.75 mm (the trim gap). Excess silicone is removed from the perimeter of the plates and the gap is slowly reduced to about 0.70 mm (the sample gap). The frequency measurement is initiated and the kinematic viscosity in centiStokes (cst) is reported as the viscosity of the material. The viscosity measured for PDMS isolated from the bottle produced in Example 1 is 2,249,000 cst. Since it is known that the viscosity of the additive will drop in the final article compared with the viscosity of the additive as it is incorporated with the thermoplastic resin, preferably, the viscosity of additive as measured in the final article is about 500,000, 1,500,000, 2,500,000 to about 20,000,000, 35,000,000 or 50,000,000 cst.

Examples/Combinations:

A. A blow molded article having at least one layer comprising:
  a) a thermoplastic resin;
  b) between 0.1% and 20% of an additive having a viscosity of greater than 1,000,000 cst, wherein there is a refractive index difference of at least 0.04 between the additive and the thermoplastic resin.

B. A blow molded article according to paragraph A, wherein the additive has a viscosity of between 1,000,000 cst and 50,000,000 cst.

C. A blow molded article according to paragraph A, wherein the thermoplastic resin is selected from a group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), low-density polyethylene (LDPE), linear low-density polyethylene (LLPDE), high-density polyethylene (HDPE), propylene (PP) and a combination thereof.

D. A blow molded article according to paragraph A, wherein the thermoplastic resin is PET.

E. A blow molded article according to paragraph A, wherein the additive is selected from a group consisting of an alcohol, oil, siloxane fluid, water, and a combination thereof.

F. A blow molded article according to paragraph A, wherein the additive is siloxane fluid having a viscosity of between 1,500,000 cst to 3,000,000 cst.

G. A blow molded article according to paragraph A, comprising between 0.5% to 10% of additive.

H. A blow molded article according to paragraph A, wherein the refractive index of the thermoplastic resin is higher than that of the additive.

I. A blow molded article according to paragraph A, further comprising between 10 to 1000 discrete domains of the additive per 1000 $\mu m^3$ of the layer.

J. A blow molded article according to paragraph I, wherein at least 50% of the domains have an aspect ratio of greater than 0, preferably between 0.01 and 0.8.

K. A blow molded article according to paragraph I, wherein at least 50% of the discrete domains in the preform and/or finished article have an aspect ratio of between 0.02 to 0.8.

L. A method of making a blow molded article having at least one layer, comprising the steps of:
  a) forming a blow mold blend by adding between 0.1% and 20% of an additive having a viscosity of greater than 1,000,000 cst to a thermoplastic resin, wherein there is a refractive index difference of at least 0.04 between the additive and the thermoplastic resin;
  b) extruding the blow mold blend to form a preform or parison; and
  c) blow molding the preform or parison to form an article.

M. A method of making a blow molded article according to paragraph L, further comprising forming a masterbatch by mixing the additive together with a carrier material prior to forming the blow mold blend, wherein the ratio of additive to carrier material is between 35:65 to 65:35.

N. A method according to paragraph M, wherein the carrier material is selected from a group consisting of low molecular weight waxes such as montan wax (available from Clariant under the tradenames Licowax®, Licolube®, Licomont®), polar polyolefin waxes (available from Clariant® under the trade name Licocene® or Honeywell® under the trade name A-C performance additives), amide waxes (available from Clariant® under the trade name Licowax C®) HYTREL® and acrylate copolymers such as Elvaloy AC® from Dupont® and low melting point copolymer polyesters such as Renol®, sold by Clariant®.

O. A method of forming a parison of preform for blow molding, comprising the steps of:
  a) forming a blow mold blend by adding between 0.1% and 20% of an additive having a viscosity of greater than 1,000,000 cst to a thermoplastic resin, wherein there is a refractive index difference of at least 0.04 between the additive and the thermoplastic resin;
  b) extruding the blow mold blend to form the preform or parison.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An injection stretched blow molded bottle with an improved visual effect comprising a neck and a body wherein the body comprises at least one layer comprising:
   a. more than 50 wt. % of a first thermoplastic resin selected from the group consisting of polyethylene terephthalate (PET), polyethylene terephthalate glycol (PETG), polyethylene naphthalate (PEN), post-consumer recycled polyethylene terephthalate (PCRPET), and combinations thereof;
   b. between about 0.1 wt. % and about 20 wt. % of a second thermoplastic material comprising a viscosity of from about 2,500,000 to about 50,000,000 cst;
      wherein the second thermoplastic material is immiscible or partially miscible with the first thermoplastic material;
   c. between about 10 to about 1000 discrete domains of the second thermoplastic material per 1000 μm3 of the at least one layer, wherein the discrete domains are dispersed throughout the at least one layer; wherein the domains comprise a length, a width, and a thickness and wherein the domains are longer than they are thick and/or wide;
      wherein there is a refractive index difference of at least about 0.04 between the second thermoplastic material and the thermoplastic resin;
      wherein the body further comprises a gloss outer surface.

2. An injection stretch blow molded bottle as in claim 1, wherein the thermoplastic resin is PET.

3. An injection stretch blow molded bottle as in claim 1, wherein the body consists of one layer.

4. An injection stretch blow molded bottle as in claim 1, wherein the neck comprises at least one layer comprising:
   a. the first thermoplastic resin;
   b. between about 0.1 wt. % and about 20 wt. % of the second thermoplastic resin;
   c. discrete domains of the second thermoplastic resin, wherein the discrete domains are dispersed throughout the at least one layer; wherein the domains comprise an aspect ratio.

5. An injection stretch blow molded bottle as in claim 4, wherein the aspect ratio of the domains in the neck are considerably lower than the aspect ratio of the domains in the body.

6. An injection stretch blow molded bottle as in claim 4, wherein at least about 50 wt. % of the discrete domains in the neck comprise an aspect ratio of between about 0.02 to about 0.8.

7. An injection stretch blow molded bottle as in claim 4, wherein the body consists of one layer.

8. An injection stretch blow molded bottle as claimed in claim 1, wherein at least about 50 wt. % of the domains in the body comprise an aspect ratio of greater than 0.

9. An injection stretch blow molded bottle as claimed in claim 1, wherein at least about 50 wt. % of the discrete domains in the body comprise an aspect ratio of between about 0.4 to about 0.9.

10. An injection stretch blow molded bottle as in claim 1, wherein the thermoplastic resin is PET.

11. An injection stretch blow molded bottle as in claim 1, wherein the bottle comprises an exterior and the exterior is glossy.

12. An injection stretched blow molded bottle with an improved visual effect comprising a neck and a body wherein the body comprises at least one layer comprising:
   a. more than 50 wt. % of a first thermoplastic resin selected from the group consisting of polyethylene terephthalate (PET), polyethylene terephthalate glycol (PETG), polyethylene naphthalate (PEN), post-consumer recycled polyethylene terephthalate (PCRPET), and combinations thereof;
   b. between about 0.1 wt. % and about 20 wt. % of a second thermoplastic resin comprising:
      i. monomers derived from non-renewable resources; and
      ii. a viscosity of from about 2,500,000 to about 50,000,000 cst;
   c. between about 10 to about 1000 discrete domains of the second thermoplastic resin per 1000 $\mu m^3$ of the at least one layer, wherein the discrete domains are dispersed throughout the at least one layer; wherein the domains comprise a length, a width, and a thickness and wherein the domains are longer than they are thick and/or wide;
      wherein there is a refractive index difference of at least about 0.04 between the second thermoplastic resin and the first thermoplastic resin;
   d. wherein the body further comprises a gloss outer surface.

13. The injection stretched blow molded bottle of claim 12, wherein the non-renewable resource comprises a post-consumer recycled material.

14. The injection stretched blow molded bottle of claim 12, wherein the non-renewable resource comprises bio-derived monomers.

15. The injection stretched blow molded bottle of claim 12, wherein the second thermoplastic resin is immiscible or partially miscible with the first thermoplastic material.

16. An injection stretch blow molded bottle as in claim 12, wherein the neck comprises at least one layer comprising:
   a. the first thermoplastic resin;
   b. between about 0.1 wt. % and about 20 wt. % of the second thermoplastic resin;
   c. discrete domains of the second thermoplastic resin, wherein the discrete domains are dispersed throughout the at least one layer; wherein the domains comprise an aspect ratio.

17. An injection stretch blow molded bottle as in claim 12, wherein the bottle comprises an exterior and the exterior is glossy.

18. An injection stretch blow molded bottle as in claim 12, wherein the body consists of one layer.

* * * * *